US011562309B2

(12) United States Patent
Mori et al.

(10) Patent No.: US 11,562,309 B2
(45) Date of Patent: Jan. 24, 2023

(54) SYSTEM, METHOD, AND NON-TRANSITORY COMPUTER READABLE MEDIUM FOR PROCESS ENGINEERING ASSISTANCE

(71) Applicant: Yokogawa Electric Corporation, Tokyo (JP)

(72) Inventors: Hiroshi Mori, Tokyo (JP); Nobuaki Ema, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 41 days.

(21) Appl. No.: 16/583,285

(22) Filed: Sep. 26, 2019

(65) Prior Publication Data
US 2020/0019902 A1  Jan. 16, 2020

Related U.S. Application Data

(63) Continuation of application No. PCT/JP2018/012225, filed on Mar. 26, 2018.

(30) Foreign Application Priority Data

Mar. 28, 2017 (JP) .............................. JP2017-063167

(51) Int. Cl.
*G06Q 10/06* (2012.01)
*H04L 9/40* (2022.01)

(52) U.S. Cl.
CPC ..... *G06Q 10/0633* (2013.01); *G06Q 10/0637* (2013.01); *G06Q 10/06316* (2013.01);
(Continued)

(58) Field of Classification Search
None
See application file for complete search history.

(56) References Cited

U.S. PATENT DOCUMENTS 8,842,841 B2 *  9/2014  Hook ........................ H04L 9/14
380/284
2003/0125815 A1  7/2003  Ghanime
(Continued)

FOREIGN PATENT DOCUMENTS

| CN | 101226615 A | 7/2008 |
| DE | 102012109348 A1 | 4/2014 |

(Continued)

OTHER PUBLICATIONS

Willett, Wesley, et al. "Identifying redundancy and exposing provenance in crowdsourced data analysis." IEEE Transactions on Visualization and Computer Graphics 19.12 (2013): 2198-2206. (Year: 2013).*

(Continued)

*Primary Examiner* — Thomas L Mansfield

(57) ABSTRACT

An engineering assistant system 1 includes: an engineering server 10 that issues a work list including information related to work necessary for performing the engineering of a process control system 100; and an at least one engineering client 20 that grants work authority for each worker based on the work list issued by the engineering server 10 and makes it possible to perform work on a constituent apparatus that constitutes the process control system 100 within a range of granted work authority.

11 Claims, 7 Drawing Sheets

(52) U.S. Cl.
CPC ............. *G06Q 10/06398* (2013.01); *G06Q 10/063114* (2013.01); *H04L 63/08* (2013.01)

(56) References Cited

U.S. PATENT DOCUMENTS

| | | | | |
|---|---|---|---|---|
| 2009/0048853 | A1* | 2/2009 | Hall | G06Q 10/20 705/305 |
| 2011/0294566 | A1* | 12/2011 | Cardno | G07F 17/32 463/25 |
| 2013/0117710 | A1* | 5/2013 | Walter | G06Q 10/08 715/790 |
| 2014/0067089 | A1 | 3/2014 | Kanbe | |
| 2014/0228976 | A1 | 8/2014 | K S | |
| 2015/0105878 | A1 | 4/2015 | Jones | |
| 2015/0213393 | A1* | 7/2015 | O'Neill | G06Q 10/063114 705/7.14 |
| 2016/0147955 | A1* | 5/2016 | Shah | G16H 40/20 705/3 |
| 2017/0061341 | A1* | 3/2017 | Haas | G06Q 30/0283 |
| 2017/0061356 | A1* | 3/2017 | Haas | G06Q 30/0283 |
| 2017/0091697 | A1* | 3/2017 | Haas | G06Q 10/06316 |
| 2017/0235848 | A1* | 8/2017 | Van Dusen | G06N 5/02 705/12 |

FOREIGN PATENT DOCUMENTS

| | | |
|---|---|---|
| JP | 2015125745 A | 7/2015 |
| WO | WO-2016003512 A1 * | 1/2016 ........... G06F 16/288 |

OTHER PUBLICATIONS

Lee, Kyong-Ha, et al. "Parallel data processing with MapReduce: a survey." AcM sIGMoD record 40.4 (2012): 11-20. (Year: 2012).*

International Search Report and (ISA/237) Written Opinion of the International Search Authority for International Patent Application No. PCT/JP2018/012225, mailed by the European Patent Office dated Jul. 2, 2018.

International Preliminary Report on Patentability for International Application No. PCT/JP2018/012225, completed by the European Patent Office dated May 8, 2019.

Notice of First Office Action for Patent Application No. 201880020802.5, issued by The National Intellectual Property Administration of the People's Republic of China dated Jan. 20, 2022.

Office Action issued for counterpart Japanese Application No. 2017-063167, issued by the Japan Patent Office dated Jun. 16, 2020 (drafted on Jun. 10, 2020).

Office Action issued for counterpart Japanese Application No. 2017-063167, issued by the Japan Patent Office dated Jan. 5, 2021 (drafted on Dec. 18, 2020).

* cited by examiner (a) T1 / J1 / L11 / PR

| I/O Tag | P&ID Tag | I/O Type | Device Address | Device Model Name | Channel Information | I/O Channel Test Result | Field Instrument Test Result | ..... | I/O Protection |
|---|---|---|---|---|---|---|---|---|---|
| | | | Communication Method | | | | | | |
| I/O-1 | TI100 | AI / 4-20mA | 00:AA:BB:CC | AB123 | 1-1 | OK | OK | ..... | ☑ |
| I/O-2 | FI200 | AI / HART | 01:02:03:04 | CD456 | 2-3 | OK | NG | ..... | ☐ |
| I/O-3 | FO300 | DO / FF | 01:02:03:08 | EF789 | 2-4 | NG | None | ..... | ☐ |

(b) T2 / J2 / L12

| I/O Tag | P&ID Tag | Device Type | I/O Type | Range | Engineering Unit |
|---|---|---|---|---|---|
| I/O-A | TI100 | Temperature Measurement | AI | 0-100 | °C |
| I/O-B | FI200 | Flow Rate Measurement | AI | 100-200 | PSI |
| I/O-C | FO300 | Flow Rate Adjustment | DO | 100-200 | PSI |

*FIG. 4*

| Role | I/O Tag | P&ID Tag | I/O Type | Communication Method | Device Address | Device Model Name | Channel Information | I/O Channel Test Result | Field Instrument Test Result | ... | I/O Protection |
|---|---|---|---|---|---|---|---|---|---|---|---|
| Work Administration | System | System | System | Field | Field | Field | Field | Field | Field | ... | System |
| System Engineer | ☑ | ☑ | ☑ | ☑ | ☑ | ☑ | ☑ | ☑ | ☑ | ... | ☑ |
| Field Engineer | ☐ | ☐ | ☑ | ☑ | ☑ | ☑ | ☑ | ☐ | ☑ | ... | ☐ |
| Tester | ☐ | ☐ | ☐ | ☐ | ☐ | ☐ | ☐ | ☐ | ☐ | ... | ☐ |

FIG. 5

SYSTEM, METHOD, AND NON-TRANSITORY COMPUTER READABLE MEDIUM FOR PROCESS ENGINEERING ASSISTANCE

CROSS REFERENCE TO RELATED APPLICATIONS

This is a continuation application of International Application No. PCT/JP2018/012225, filed on Mar. 26, 2018, which claims priority to Japanese Patent Application No. 2017-063167, filed on Mar. 28, 2017, the contents of each of which are incorporated herein by reference.

1. TECHNICAL FIELD

The present invention relates to an engineering assistant system, engineering assistant method, server apparatus, storage medium, client apparatus and client program.

2. RELATED ART

A process control system constructed at a plant or the like has a configuration in which: site instruments (measuring instruments, operation instruments) generally called field instruments; controllers to control the field instruments; and operation monitoring terminals (HMI: Human Machine Interfaces) to perform operation, monitoring and so on of the field instruments and the controllers are connected through communication means. In this process control system, the controller collects process values obtained at the field instruments (for example, measured values about pressure, temperature, flow rate and the like) and the controller performs actions to operate (control) the field instruments according to the collected process values. Such actions are repeated while being monitored by the operation monitoring terminal to realize high-level automatic operation of a plant or the like.

Designing, construction and maintenance (engineering) of a process control system are generally performed by many workers. For example, designing of an operation plan of a process control system is performed by a plant engineer, and creation of the specifications of the process control system to realize the designed operation plan is performed by a system engineer. Also, construction and maintenance of the process control system are performed by cooperation between the system engineer and site engineers who are in charge of respective components constituting the process control system (field instrument, controller, operation monitoring terminal, network, various types of program used in the process control system, and the like).

Patent Document 1 mentioned below discloses one example of techniques to assist maintenance of process control systems. Specifically, Patent Document 1 mentioned below discloses a technique to assist maintenance of process control systems. The technique includes a storage means that stores specification information indicating specifications of a process control system and an extracting means that extracts actual situation information indicating an actual situation of the process control system, and compares the specification information stored in the storage means and the actual situation information extracted by the extracting means to present a difference between the actual situation and specifications of the process control system.
Patent Document 1: Japanese Patent No. 5652444

SUMMARY

Meanwhile, as mentioned above, engineering of a process control system is performed, involving many workers. The larger the scale of a process control system becomes, the larger the number of workers involved in engineering of the process control system becomes. If the number of workers increases, various types of work are in many cases performed in parallel. For example, if a process control system is to be constructed, setting work on an I/O module for connecting a plurality of field instruments to a controller, setting work on a program to be used at the controller, and setting work on a program to be used at an operation monitoring terminal are performed in parallel. By various types of work being performed in parallel in this manner, time required for construction, maintenance and so on of the process control system can be shortened.

However, in a situation where various types of work are performed in parallel, there are drawbacks that differences might be generated in engineering quality due to differences in the skills of workers, and erroneous setting might occur due to wasteful redundant work being performed or work mistakes. For example, it is possible to conceive of a situation where setting work is performed again by a worker about an item which has already been set by setting work by another worker. In this situation, if the same value as a previously set value was set, this means that wasteful redundant work was performed, and if a value different from a previously set value was set, this means that erroneous setting by a work mistake was performed.

In recent years, process control systems have increasingly closer coordination among components because processes of the systems have been digitized, have become intelligent and so on. Here, if even part of a process control system has a portion with low engineering quality, a portion on which erroneous setting has been performed due to a work mistake and so on, there is a fear that negative influence may affect the entire process control system. Because of this, when performing construction, maintenance and so on of the process control system, it is extremely important to ensure engineering quality and reduce work mistakes.

The present invention has been made in view of the above-mentioned circumstance, and an object thereof is to provide an engineering assistant system, engineering assistant method, server apparatus, storage medium, client apparatus and client program that can reduce work mistakes while ensuring engineering quality.

BRIEF DESCRIPTION OF DRAWINGS

FIG. 4 is a figure showing one example of a work instruction list used in one embodiment of the present invention.

FIG. 5 is a figure showing one example of a work authority list used in one embodiment of the present invention.

DESCRIPTION OF EXEMPLARY EMBODIMENTS

Hereinafter, an engineering assistant system, engineering assistant method, server apparatus, storage medium, client apparatus and client program according to one embodiment of the present invention are explained in detail referring to the figures. In the following explanation, a process control system which is an engineering assistance target is explained first, and thereafter an engineering assistant system that performs assistance of engineering of the process control system is explained.

Figure 1:
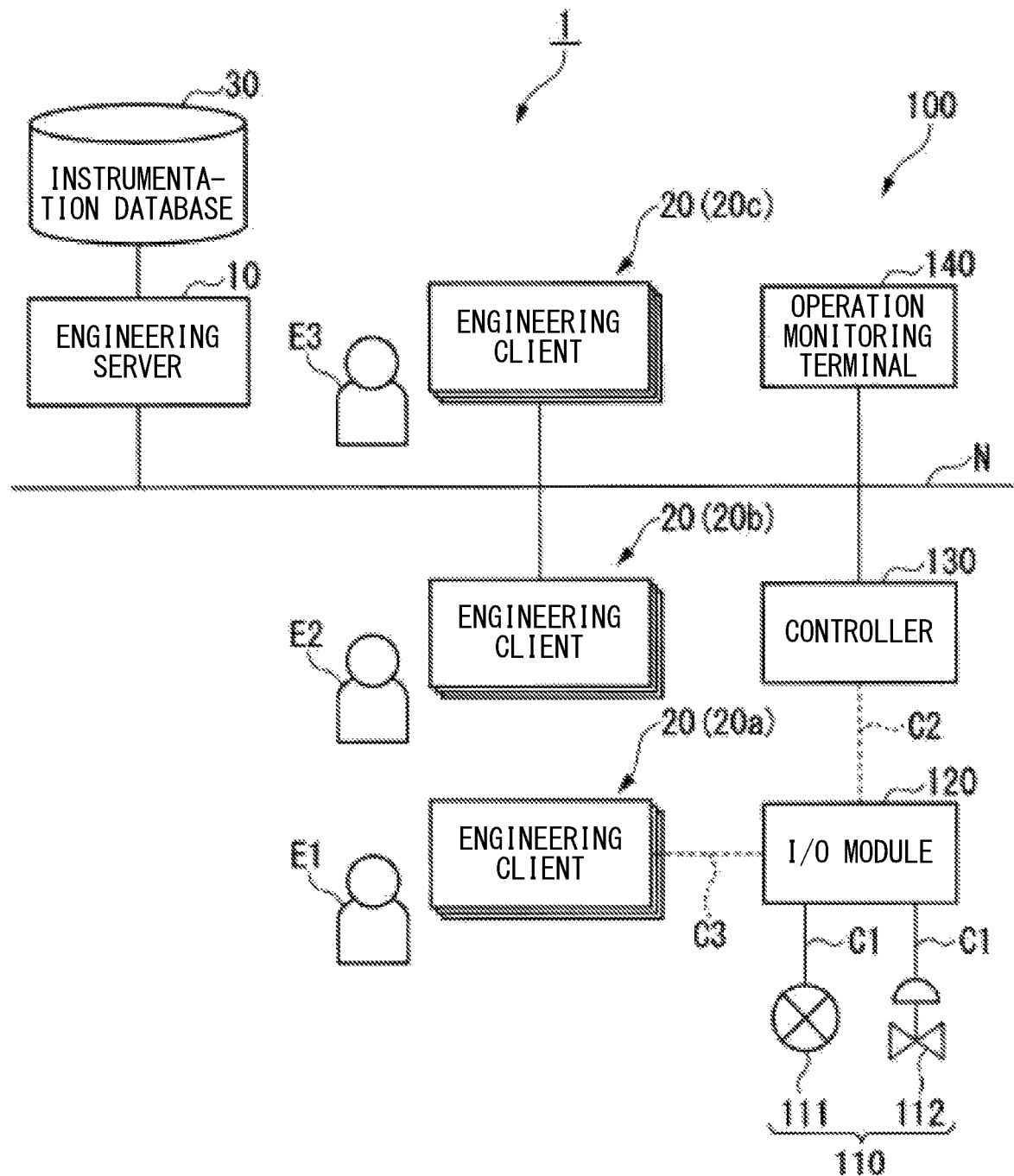
FIG. 1 is a block diagram showing a main-part configuration of an engineering assistant system and process control system according to one embodiment of the present invention.

[Process Control System] FIG. 1 is a block diagram showing a main-part configuration of an engineering assistant system and process control system according to one embodiment of the present invention. As shown in FIG. 1, a process control system 100 includes a field instrument 110, an I/O module 120, a controller 130 and an operation monitoring terminal 140, and performs control of industrial processes realized at a plant (illustration omitted) by the controller 130 controlling the field instrument 110 according to an instruction from the operation monitoring terminal 140 or the like. The process control system 100 is constructed or maintained while being assisted by an engineering assistant system 1 mentioned below.

The field instrument 110 and the I/O module 120 are connected by transmission lines C1, and the I/O module 120 and the controller 130 are connected by a cable C2. At the time of construction of the process control system 100, various types of setting of each of the I/O module 120 and the controller 130 are performed with the I/O module 120 and the controller 130 not being connected by the cable C2. Because of this, the cable C2 is indicated with a dashed line in FIG. 1. Also, the controller 130 and the operation monitoring terminal 140 are connected to a control network N. The control network N is for example a network that connects a site of the plant and a monitor room.

The field instrument 110 is for example: a sensor instrument such as a flowmeter or a temperature sensor; a valve instrument such as a flow rate control valve or an opening-closing valve; an actuator instrument such as a fan or a motor; or another instrument that is installed at a site of the plant. In the present embodiment, to facilitate understanding, an exemplary case where the quantity of state in an industrial process that should be controlled is a fluid flow rate is explained. Because of this, in FIG. 1, one sensor instrument 111 to measure the flow rate of a fluid and one valve instrument 112 to control (operate) the flow rate of the fluid among a plurality of the field instruments 110 installed at the plant are illustrated.

The I/O module 120 is provided between the field instrument 110 and the controller 130, is provided with a plurality of I/O channels (illustration omitted) to which the field instrument 110 is connected, and performs processing on signals input/output between the controller 130 and the field instrument 110 connected to each of the I/O channels. For example, it performs processing to convert a signal obtained from the field instrument 110 into a signal that the controller 130 can receive. This I/O module 120 may optionally be a module that connects a plurality of the field instruments 110 to the controller 130, and performs relaying of signals input and output at the field instrument 110 and signals input and output at the controller 130.

The controller 130 performs communication with the field instrument 110 according to an instruction from the operation monitoring terminal 140 or the like to perform control of the field instrument 110. Specifically, the controller 130 acquires a process value measured by a certain field instrument 110 (for example, the sensor instrument 111), and calculates and transmits the amount of operation of another field instrument 110 (for example, the valve instrument 112), thereby controlling the other field instrument 110 (for example, the valve instrument 112).

The operation monitoring terminal 140 is for example a terminal that is operated by a plant operator and is used for monitoring of processes. Specifically, the operation monitoring terminal 140 acquires input/output data of the field instrument 110 from the controller 130 and communicates behavior of the field instrument 110, the controller 130 and so on constituting the process control system 100 to an operator, and additionally performs control of the controller 130 based on an instruction from the operator.

[Engineering Assistant system] The engineering assistant system 1 includes an engineering server 10 (server apparatus), an engineering client 20 (client apparatus), and an instrumentation database 30 as shown in FIG. 1, and assists engineering of the above-mentioned process control system 100.

The engineering server 10 is connected to the control network N, and creates a work list including information related to work necessary for performing engineering of the process control system 100. Specifically, for example based on an instruction from a system engineer or project manager, the engineering server 10 creates the above-mentioned work list using design information stored in the instrumentation database 30.

Figure 2:
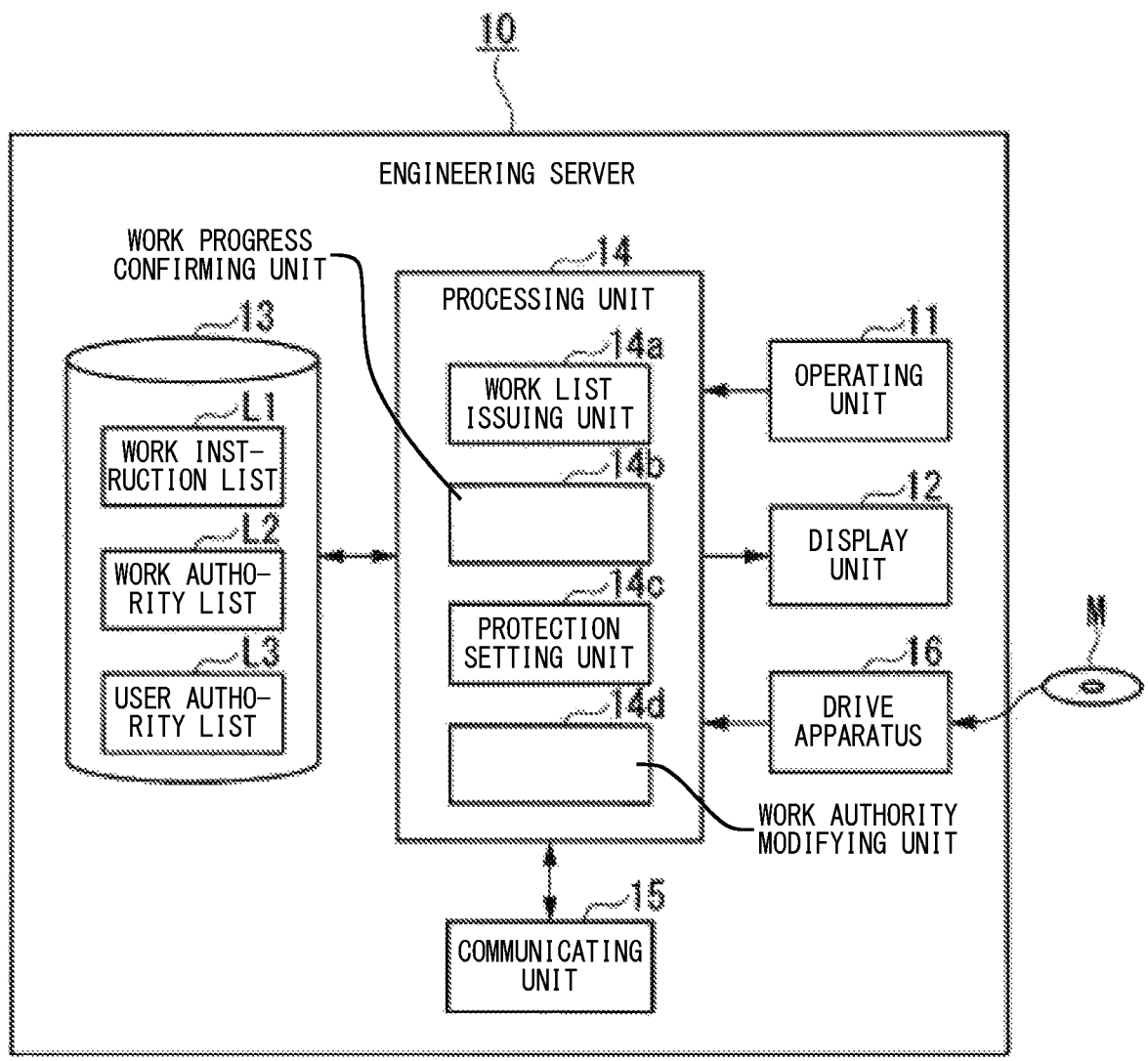
FIG. 2 is a block diagram showing a main-part configuration of an engineering server.

Examples of work lists created by the engineering server 10 include a work instruction list L1 (first list), a work authority list L2 (second list) and a user authority list L3 (third list) shown in FIG. 2. Also, the engineering server 10 makes copies of created work lists and transmits (issues) them to the engineering client 20. As disclosed in the publication of Japanese Patent No. 5652444, the above-mentioned work lists may be created automatically.

The work instruction list L1 is a list defining work necessary for performing engineering of the process control system 100. The work authority list L2 is a list defining information related to authority corresponding to roles of workers to perform engineering of the process control system 100. The user authority list L3 is a list defining information indicating a role of each worker. Details of the work instruction list L1, the work authority list L2 and the user authority list L3 are mentioned below.

Here, the above-mentioned roles of workers mean the types of occupation of workers, so to speak (or skills of workers), and examples thereof include system engineers, field engineers and testers, for example. System engineers are for example engineers who give instructions about designing, construction, testing or the like of the process control system 100, field engineers are for example engineers who work at a site of a plant, and testers are for example engineers who conduct various types of tests at a site of a plant. That is, instruments/apparatuses at which work of respective workers are targeted can be grasped based on roles of the workers.

Also, the engineering server 10 acquires a work progress list L4 generated at the engineering client 20 (details thereof are mentioned below; refer to FIG. 7), and confirms the progress situation of work. Also, based on contents of the work progress list L4 acquired, the engineering server 10 sets a protection flag (protection information) for work having been performed among work defined in the work instruction list L1. This protection flag is for preventing editing of work that has already been performed among work defined in the work instruction list L1, and is for preventing erroneous editing, redundant work and so on.

The engineering client 20 is a terminal apparatus that performs work on constituent apparatuses constituting the process control system 100 based on the above-mentioned work lists (the work instruction list L1, work authority list L2 and user authority list L3) issued at the engineering server 10. The constituent apparatuses constituting the process control system 100 are the field instrument 110, I/O module 120, controller 130 and operation monitoring terminal 140 shown in FIG. 1, and the like.

This engineering client 20 performs authentication of workers to use the engineering client 20, and based on the above-mentioned work instruction list L1, work authority list L2 and user authority list L3, grants work authority of work that authenticated workers can perform using the engineering client 20. Such work authority is granted in order to reduce work mistakes while ensuring the engineering quality. Also, the engineering client 20 generates the work progress list L4 indicating the progress situation of work performed according to an instruction from a worker.

Here, in FIG. 1, in order to facilitate understanding, an engineering client 20a used by a field engineer E1, an engineering client 20b used by a control engineer E2, and an engineering client 20c used by an HMI engineer E3 are exemplified as the engineering client 20. In the following explanation, when these engineering clients 20a to 20c are distinguished, they are referred to as the "engineering clients 20a to 20c", and when the engineering clients 20a to 20c are not distinguished, but referred to collectively, they are referred to as the "engineering client 20".

The above-mentioned field engineer E1 is an engineer who performs setting work on the field instrument 110, the I/O module 120 and so on, and the like, for example, in a site of a plant. The above-mentioned control engineer E2 is an engineer who performs setting work on the controller 130, and the like, for example. The above-mentioned HMI engineer E3 is an engineer who performs setting work on the operation monitoring terminal 140, and the like, for example. Because of this, the engineering client 20a is used in setting work on the field instrument 110, the I/O module 120 and so on, and the like, the engineering client 20b is used in setting work on the controller 130, and the like, and the engineering client 20c is used in setting work on the operation monitoring terminal 140, and the like. Work lists to be sent from the engineering server 10 to each of the engineering clients 20a to 20c may be the same.

The example shown in FIG. 1 shows a state where the engineering clients 20b, 20c are connected to the control network N, and the engineering client 20a is not connected to the control network N. If the above-mentioned work instruction list L1, work authority list L2 and user authority list L3, and the work progress list L4 can be transferred to or from the engineering server 10, the engineering client 20 needs not be connected to the control network N necessarily.

Also, the example shown in FIG. 1 shows a state where the engineering client 20a is connected to the I/O module 120 through a cable C3. The engineering client 20a is connected to the I/O module 120 at the time of construction of the process control system 100, or the like, for example, but is disconnected from the I/O module 120 upon completion of the construction of the process control system 100, or the like. Because of this, the cable C3 is indicated with a dashed line in FIG. 1. Details of the engineering client 20 are mentioned below.

The instrumentation database 30 stores the above-mentioned design information to be referred to at the engineering server 10. This design information is for example information defining specifications of the field instrument 110, specifications of the controller 130, and screen setting of the operation monitoring terminal 140 that constitute the process control system 100, or the like, and is created by a system engineer.

[Engineering Server] FIG. 2 is a block diagram showing a main-part configuration of the engineering server. As shown in FIG. 2, the engineering server 10 includes an operating unit 11, a display unit 12, a storing unit 13 (storage means), a processing unit 14, a communicating unit 15 and a drive apparatus 16. Such an engineering server 10 is realized for example by a personal computer, a work station or the like.

The operating unit 11 includes an input apparatus such as a keyboard or a pointing device, for example, and outputs, to the processing unit 14, an instruction corresponding to operation of a worker using the engineering server 10 (instruction to the engineering server 10). The display unit 12 includes a display apparatus such as a liquid crystal display apparatus, for example, and displays various types of information output from the processing unit 14. The operating unit 11 and the display unit 12 may be physically separate units, or may be a physically integrated unit like a touch panel liquid crystal display apparatus having both a display function and an operation function.

The storing unit 13 includes an auxiliary storage apparatus such as a HDD (hard disk drive) or a SSD (solid state drive), for example, and stores various types of data. For example, the storing unit 13 stores the work lists (the work instruction list L1, the work authority list L2 and the user authority list L3) created at the engineering server 10. The storing unit 13 also stores various types of program to be executed at the engineering server 10, for example.

The processing unit 14 globally controls actions of the engineering server 10 based on an operation instruction input through the operating unit 11 or an instruction transmitted through the control network N. This processing unit 14 includes a work list issuing unit 14a (issuing means), a work progress confirming unit 14b, a protection setting unit 14c and a work authority modifying unit 14d. Based on operation on the operating unit 11, the work list issuing unit 14a uses design information stored in the instrumentation database 30 to performs creation and issuance of the work lists (the work instruction list L1, the work authority list L2 and the user authority list L3).

The work progress confirming unit 14b acquires the work progress list L4 generated at the engineering client 20, and refers to the acquired work progress list L4 to confirm the progress situation of work. Based on contents of the work progress list L4 acquired at the work progress confirming unit 14b, the protection setting unit 14c sets the above-mentioned protection flag for work having been performed among work defined in the work instruction list L1.

The work authority modifying unit 14d performs modification of work authority if modification of the work authority became necessary according to the progress situation of work. Examples of situations where such modification becomes necessary include a situation where specific partial work has been completed. For example, such a situation is where setting of an I/O module 120 has been completed, in the case that after setting of the I/O module 120 has been completed, respective setting of the sensor instrument 111 connected to the I/O module 120 and of the valve instrument 112 to act based on a result of measurement by this sensor instrument 111 becomes possible. In this example, the work authority modifying unit 14d grants, to a worker (field engineer E1), work authority about the sensor instrument 111 and the valve instrument 112 if the work progress confirming unit 14b confirms that setting work for the I/O module 120 has been completed.

The communicating unit 15 is controlled by the processing unit 14 and performs communication through the control network N. In the example shown in FIG. 1, for example, the engineering client 20a is in some cases connected directly to the engineering server 10. Also, an attachable and detachable electronic medium such as a USB (Universal Serial Bus) memory (illustration omitted) is in some cases attached to the engineering server 10. In such a case, the communicating unit 15 performs communication with the directly connected engineering client 20a or the USB memory. The communicating unit 15 may perform wired communication or may perform wireless communication.

The drive apparatus 16 reads out data recorded in a computer-readable storage medium M such as a CD-ROM or DVD (registered trademark)-ROM, for example.

This storage medium M stores a program that realizes a function of each block of the engineering server 10 (for example, functions of the work list issuing unit 14a to the work authority modifying unit 14d provided to the processing unit 14).

Such a program stored in the storage medium M is read in by the drive apparatus 16, and is installed on the engineering server 10; thereby, a function of each block of the engineering server 10 is realized like software. That is, these functions are realized by software and hardware resources cooperating with each other. A program to realize a function of each block of the engineering server 10 may be distributed while being recorded in the storage medium M or may be distributed through an external network such as the Internet.

Figure 3:
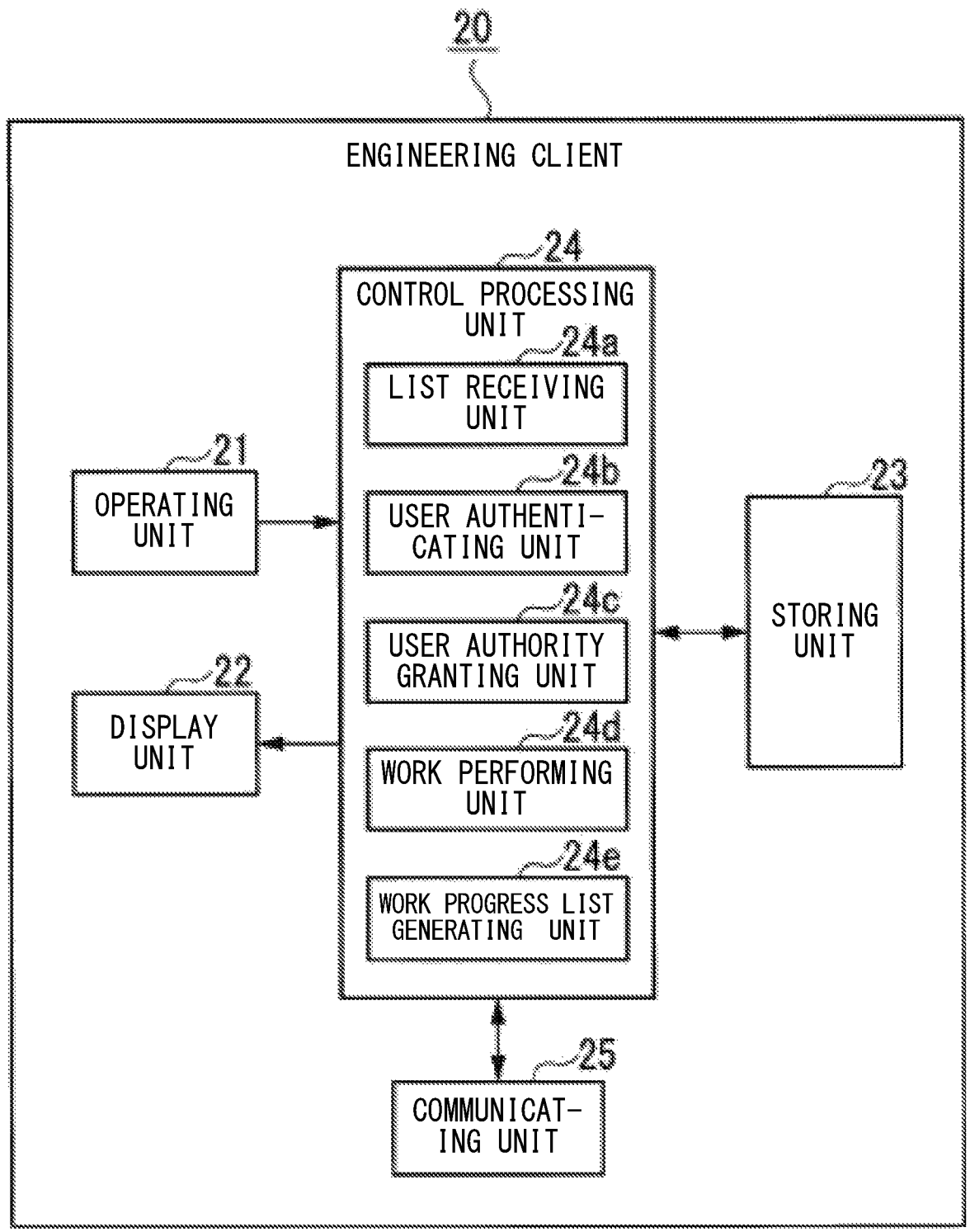
FIG. 3 is a block diagram showing a main-part configuration of an engineering client.

[Engineering Client] FIG. 3 is a block diagram showing a main-part configuration of the engineering client. As shown in FIG. 3, the engineering client 20 includes an operating unit 21, a display unit 22, a storing unit 23, a control processing unit 24 and a communicating unit 25. Such an engineering client 20 is realized by a desktop type, notebook type or tablet type personal computer, for example.

The operating unit 21 and the display unit 22 are similar to the operating unit 11 and display unit 12 shown in FIG. 2, respectively. Similar to the operating unit 11 and display unit 12 shown in FIG. 2, the operating unit 21 and the display unit 22 may be physically separate units, or may be a physically integrated unit like a touch panel liquid crystal display apparatus having both a display function and an operation function. The storing unit 23 includes a volatile memory or non-volatile memory, for example, and stores various types of data to be used at the engineering client 20.

The control processing unit 24 globally controls actions of the engineering client 20, and additionally performs processes necessary for performing various types of setting of the field instrument 110, I/O module 120, controller 130 and operation monitoring terminal 140 that constitute the process control system 100, or the like. This control processing unit 24 includes a list receiving unit 24a, a user authenticating unit 24b (authenticating unit, authenticating means), a user authority granting unit 24c (authority granting unit, authority granting means), a work performing unit 24d and a work progress list generating unit 24e.

The list receiving unit 24a receives the work lists (the work instruction list L1, the work authority list L2 and the user authority list L3) issued by the engineering server 10. The user authenticating unit 24b performs authentication of a worker to use the engineering client 20. For example, the user authenticating unit 24b collates a user ID and password for authentication input through the operating unit 21 with a user ID and password for authentication retained in advance to perform authentication of a worker to use the engineering client 20.

Based on the work authority list L2 and user authority list L3 received at the list receiving unit 24a, the user authority granting unit 24c grants work authority about work that a worker authenticated by the user authenticating unit 24b is allowed to perform (work that a worker authenticated by the user authenticating unit 24b is enabled to perform using the engineering client 20) among work defined in the work instruction list L1. Specific details about granting of work authority performed by the user authority granting unit 24c are mentioned below.

Based on an instruction input through the operating unit 21, the work performing unit 24d performs various types of work necessary for performing engineering of the process control system 100. For example, the work performing unit 24d of the engineering client 20a performs setting work on the field instrument 110, the I/O module 120 and so on, and the like, the work performing unit 24d of the engineering client 20b performs setting work of the controller 130, and the like, and the work performing unit 24d of the engineering client 20c performs setting work of the operation monitoring terminal 140, and the like.

The work progress list generating unit 24e performs generation and issuance of the work progress list L4 indicating the progress situation of work performed at the work performing unit 24d. Work performed at the work performing unit 24d may end (be completed) without abnormality or may end (fail) due to abnormality. The work progress list generating unit 24e includes not only information indicating work performed at the work performing unit 24d but also information indicating a result of performed work.

Here, as mentioned above, the work instruction list L1 is a list defining work necessary for performing engineering of the process control system 100. Because of this, the work instruction list L1 to which information related to work performed at the work performing unit 24d is added may be used as the work progress list L4. That is, the work progress list generating unit 24e may generate, as the work progress list L4, the work instruction list L1 received at the list receiving unit 24a to which information related to work performed at the work performing unit 24d is added.

The communicating unit 25 performs communication with an external instrument. For example, if the engineering client 20a shown in FIG. 1 is connected directly to the engineering server 10, the communicating unit 25 provided to the engineering client 20a performs communication with the engineering server 10 through the control network N. Also, the communicating unit 25 provided to the engineering clients 20b, 20c shown in FIG. 1 performs communication with the engineering server 10 through the control network N. If an attachable and detachable electronic medium such as a USB memory (illustration omitted) is attached to the engineering client 20, the communicating unit 25 performs communication with the USB memory. The communicating unit 25 may perform wired communication or may perform wireless communication.

Each block provided to the control processing unit 24 mentioned above (the list receiving unit 24a, the user authenticating unit 24b, the user authority granting unit 24c, the work performing unit 24d and the work progress list generating unit 24e) is realized by a program to realize a function of each of them being executed at a CPU (central processing unit) provided to a computer. That is, each block provided to the control processing unit 24 is realized by software and hardware resources cooperating with each other.

Here, the programs to realize the above-mentioned functions are for example distributed while being recorded in a computer-readable storage medium such as a CD-ROM or a DVD (registered trademark) ROM or distributed through an external network such as the Internet. The above-mentioned various types of function provided to the control processing unit 24 of the engineering client 20 are realized like software by a program recorded in a storage medium being read out and installed or by a program downloaded through an external network being installed.

[Work Instruction List] FIG. 4 is a figure showing one example of a work instruction list used in one embodiment of the present invention. The work instruction list L1 includes a work instruction list L11 shown in (a) in FIG. 4 and a work instruction list L12 shown in (b) in FIG. 4. The work instruction list L11 shown in (a) in FIG. 4 is a list defining work instructions to the I/O module 120, and the work instruction list L12 shown in (b) in FIG. 4 is a list defining work instructions to the controller 130. As mentioned above, the work instruction list L1 is issued by the engineering server 10 and is used at the engineering client 20.

As shown in (a) in FIG. 4, the work instruction list L11 is a list in which input/output information J1 and I/O protection information PR (protection information) are associated with an I/O tag T1 set for each of I/O channels (illustration omitted) of the I/O module 120. The input/output information J1 is information related to input/output of the field instrument 110 connected to each of I/O channels or the like. In the example shown in (a) in FIG. 4, items of the input/output information J1 include "P&ID Tag", "I/O Type", "Communication Method", "Device Address", "Device Model Name" "Channel Information", "I/O Channel Test Result", "Field Instrument Test Result" and the like.

"P&ID Tag" is a tag used for logically indicating each of I/O channels provided to the I/O module 120 in a piping and instrumentation diagram (P&ID) of a plant. "I/O Type" is information indicating the type of input/output of the field instrument 110 (analog signal input (AI), analog signal output (AO), discrete signal input (DI), discrete signal output (DO) and the like).

"Communication Method" is information indicating the communication method used at the field instrument 110. In the example shown in (a) in FIG. 4, a communication method using 4-20 mA signals, a communication method complying with HART (registered trademark), and a communication method complying with FF (Foundation Fieldbus) (registered trademark) are exemplified. "Device Address" is information indicating the address allocated to the field instrument 110, "Device Model Name" is information indicating the format (model name) of the field instrument 110, and "Channel Information" is information indicating the communication channel used at the field instrument 110.

"I/O channel Test Result" is a test result of a test conducted for each of I/O channels (for example, a state confirmation test), and "Field Instrument Test Result" is a test result of a test conducted for the field instrument 110 connected to each of I/O channels (for example, a state confirmation test). In the example shown in (a) in FIG. 4, "OK" indicating "pass", "NG" indicating "failure to pass" and "None" indicating absence of test results are shown as I/O channel test results and field instrument test results.

The I/O protection information PR defines whether or not to allow modification (editing) of the input/output information J1 associated with the I/O tag T1. Because this I/O protection information PR defines whether or not to allow modification of "I/O Channel Test Result" and "Field Instrument Test Result" included in the input/output information J1, the I/O protection information PR also defines whether or not it is allowed to conduct a test on an I/O channel for which the I/O tag T1 is set. That is, the I/O protection information PR is for defining whether or not to protect the state of an I/O channel.

In the example shown in (a) in FIG. 4, the presence or absence of an I/O protection flag (a "checked check box" or an "unchecked check box") is shown as the I/O protection information PR. If there is an I/O protection flag (in the case of a "checked check box"), it is indicated that the state of an I/O channel is protected, and if there is not an I/O protection flag (in the case of an "unchecked check box"), it is indicated that the state of an I/O channel is not protected. If the work instruction list L11 is displayed at the engineering server 10 or the engineering client 20, as shown in (a) in FIG. 4, a row where there is an I/O protection flag becomes grayed out, which means that modification of contents is not allowed in the absence of authority, for example. Someone who has authority to be able to perform setting (modification) of an I/O protection flag is a system engineer, for example.

As shown in (b) in FIG. 4, the work instruction list L12 is a list in which a tag T2 used at the controller 130 for logically identifying each of I/O channels of the I/O module 120 and input/output information J2 at the I/O channel are associated with each other. In the example shown in (b) in FIG. 4, items of the input/output information J2 at the I/O channels include "P&ID Tag", "Device Type", "I/O Type", "Range", "Engineering Unit" and the like. The work instruction list L12 may be a list to which items of I/O protection information are provided or a list integrated with the work instruction list L11. Furthermore, the input/output information J2 cannot be modified by a field engineer, a tester and so on (a worker for which work administration mentioned below is set on the field side) regardless of the presence or absence of a check mark for I/O protection information.

"P&ID Tag" and "I/O Type" are similar to those included in the input/output information J1 of the work instruction list L11. "Device Type" is information indicating the function of the field instrument 110 connected to an I/O channel. In the example shown in (b) in FIG. 4, temperature measurement, flow rate measurement, flow rate adjustment and the like are exemplified. "Range" is information indicating the range of magnitude of signals input and output at an I/O channel. "Engineering Unit" is information indicating the unit of signals input and output at an I/O channel. For example, if signals input and output at an I/O channel are signals indicating temperature, "degrees Celsius" is defined as "Engineering Unit".

[Work Authority List] FIG. 5 is a figure showing one example of a work authority list used in one embodiment of the present invention. As mentioned above, the work authority list L2 also is issued by the engineering server 10 and is used at the engineering client 20. The work authority list L2 is used in limiting the range of work defined in the work instruction list L1 that can be performed, according to roles of workers, in the unit of item in the work instruction list L1 (the I/O tag T1, each item in the input/output information J1 and the I/O protection information PR). In other words, the work authority list L2 is used in granting authority about work defined in the work instruction list L1 that can be performed, according to roles of workers, in the above-mentioned unit of item in the work instruction list L1.

As shown in FIG. 5, the work authority list L2 is a list in which possibility information ED defining whether or not to allow modification of each item in the work instruction list L1 is associated with a role of worker Q1. In the example shown in FIG. 5, roles of worker Q1 include "System Engineer", "Field Engineer" and "Tester". Also, in the example shown in FIG. 5, the presence or absence of a permission flag (a "checked check box" or an "unchecked check box") for each combination of a role of worker Q1 and an item in the work instruction list L1 is shown as the possibility information ED. The role of worker "Field Engineer" may be subdivided into a role for each assigned facility such as a sensor, a valve or a transmitter, and authority may be set for each of those subdivided roles. The same may apply to the roles of worker "System Engineer" and "Tester", and roles may be subdivided for each of assigned facilities, for example.

If there is a permission flag (in the case of a "checked check box"), it is indicated that modification of an item in the column is permitted for the role of worker in the row. In contrast to this, if there is not a permission flag (in the case of an "unchecked check box"), it is indicated that modification of an item in the column is not permitted for the role of worker in the row. However, even if there is a permission flag, modification is not permitted if not included in pre-defined work administration (information defining which among roles of worker is in charge of work about each of items in the work instruction list L1). Such work administration is used in order to strictly limit the range of work defined in the work instruction list L1 that can be performed, according to roles of worker.

In the example shown in FIG. 5, the work administration includes "System" and "Field" set for each item in the work instruction list L1. The setting of this work administration can be modified by someone who take control of the entire project (for example, a project leader), or someone having modification authority (for example, a system engineer or the like). "System" indicates that it is an item that a system engineer is permitted to modify, and "Field" indicates that it is an item that a field engineer and a tester working at a site of a plant are permitted to modify.

Because of this, in the example shown in FIG. 5, there is a permission flag in the column of "I/O Protection" in the row of "System Engineer", and the work administration of "I/O Protection" is "System"; therefore, "System Engineer" is able to modify "I/O Protection". In contrast to this, in the example shown in FIG. 5, there is a permission flag in the column of "I/O Type" in the row of "Field Engineer", but the work administration of "I/O Type" is "System" and is not included in the work administration of "Field Engineer"; therefore, "Field Engineer" cannot modify "I/O Type". In the example shown in FIG. 5, there is no permission flags at all in the row of "Tester", and this is because testers do not have authority to modify various types of setting, but they are permitted only to conduct tests.

If the work authority list L2 is displayed at the engineering server 10 or the engineering client 20, as shown in FIG. 5, the range not included in work administration is grayed out, for example. Specifically, if the work administration is "System", corresponding cells for "Field Engineer" and "Tester" are grayed out. In contrast to this, if the work administration is "Field", corresponding cells for "System Engineer" are grayed out. The grayed-out cells cannot be modified (edited) regardless of the presence or absence of permission flags. Because of this, as mentioned above, there is a permission flag in the column of "I/O Type" in the row of "Field Engineer", but the work administration of "I/O Type" is not included in the work administration of "Field Engineer"; therefore, "Field Engineer" cannot modify "I/O Type".

By information being displayed according to the work administration as shown in FIG. 5, workers can grasp the work administration of respective workers immediately. Here, because in the work authority list L2, permission flags set for the grayed-out range become invalid, for example, modification (editing) of grayed-out portions is not allowed even for a user who plays a role having modification authority (for whom a permission flag is set).

Figure 6:
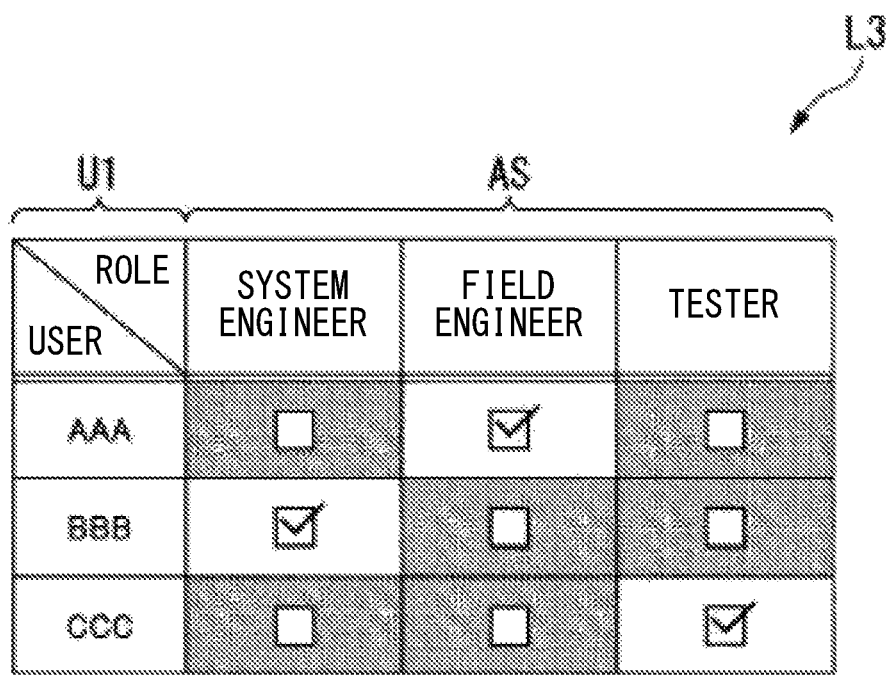
FIG. 6 is a figure showing one example of a user authority list used in one embodiment of the present invention.

[User Authority List] FIG. 6 is a figure showing one example of the user authority list used in one embodiment of the present invention. Similar to the work authority list L2, the user authority list L3 is issued by the engineering server 10 and is used at the engineering client 20. The user authority list L3 is used in setting a role for a worker (user). This user authority list L3 is associated with the work authority list L2 by role names.

As shown in FIG. 6, the user authority list L3 is a list in which allocation information AS defining a role to be set is associated with a worker U1. In the example shown in FIG. 6, workers (users) U1 include "AAA", "BBB" and "CCC". Also, in the example shown in FIG. 6, the presence or absence of a permission flag (a "checked check box" or an "unchecked check box") for each combination of a worker (user) U1 and a role is shown as allocation information AS.

If there is a flag (in the case of a "checked check box"), it is indicated that a role of the column is allocated to a worker of the row. If there is not a flag (in the case of an "unchecked check box"), it is indicated that a role of the column is not allocated to a worker of the row. If the user authority list L3 is displayed at the engineering server 10 or the engineering client 20, as shown in FIG. 6, a portion where there is not a flag is grayed out, for example. By information being displayed in this manner, each worker can immediately grasp a role allocated to him/herself.

Here, because as mentioned above, the user authority list L3 and the work authority list L2 are associated with each other by role names, authority to modify the work instruction list L1 can be set for each worker who uses the engineering client 20. Because of this, for example, by allocating a role of "Field Engineer" to a plurality of users in the user authority list L3, appropriate authority setting can be performed also if a plurality of workers use a plurality of the engineering clients 20 to perform setting and conduct tests in parallel on a plurality of the I/O modules 120 and the field instruments 110.

In the present embodiment, in order to facilitate understanding, it is assumed that the work instruction list L1, the work authority list L2 and the user authority list L3 are issued as separate lists from the engineering server 10. However, these work instruction list L1, work authority list L2 and user authority list L3 may be issued as a single list. Also, a list with the same contents may be issued to all the engineering clients 20a, 20b, 20c, or a list specialized for each of the engineering client 20a, 20b, 20c (a list with different contents) may be also issued.

Figure 7:
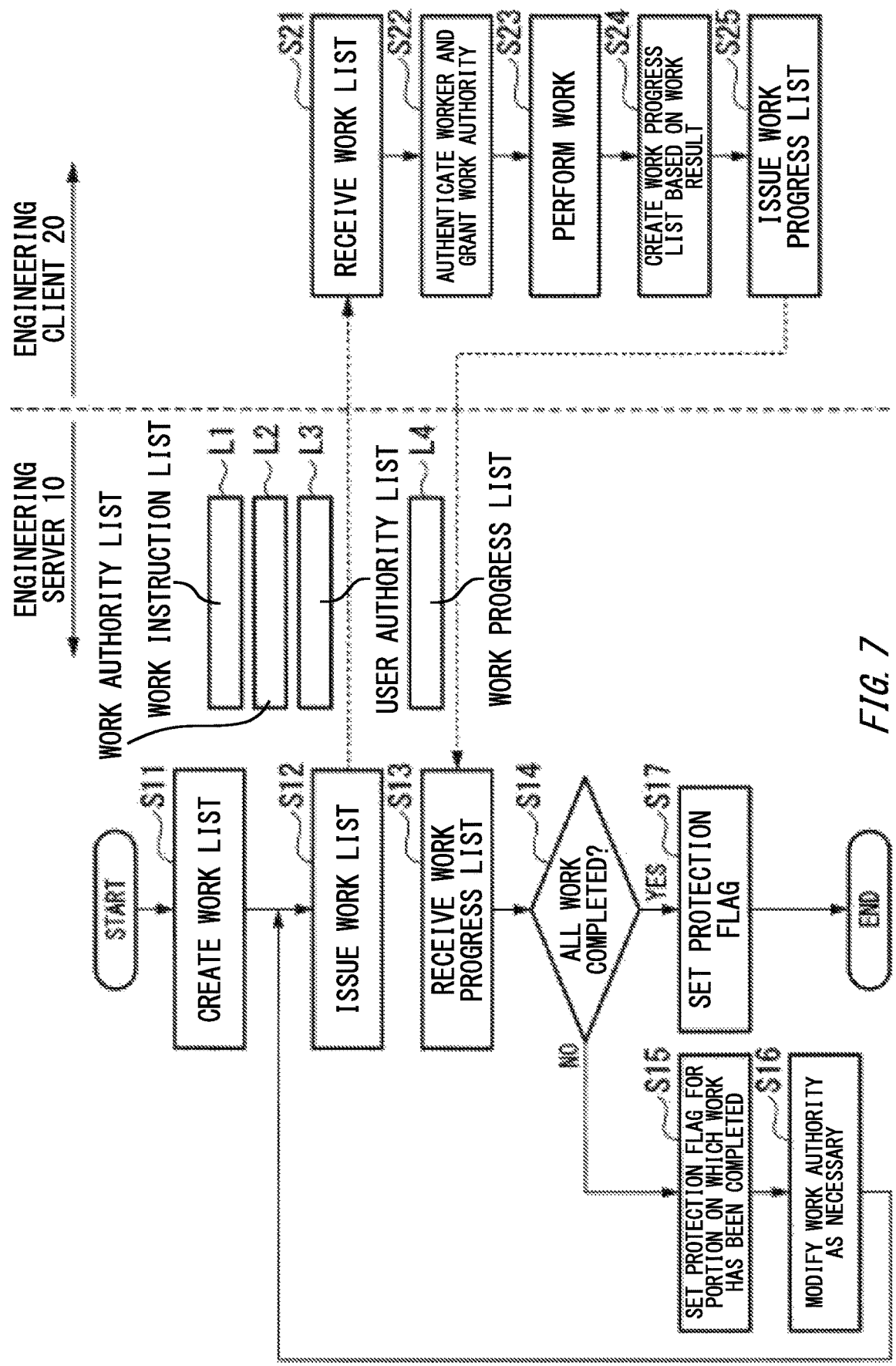
FIG. 7 is a flowchart showing an engineering assistant method according to one embodiment of the present invention.

[Engineering Assistant Method] FIG. 7 is a flowchart showing an engineering assistant method according to one embodiment of the present invention. As shown in FIG. 7, first, at the engineering server 10, a process of creating the work lists (the work instruction list L1, the work authority list L2 and the user authority list L3) is performed (Step S11).

Specifically, for example, the operating unit 11 of the engineering server 10 is operated by a system engineer or project manager, and based on an instruction input through the operating unit 11, a process of creating a work list using design information stored in the instrumentation database 30 is performed at the work list issuing unit 14a of the engineering server 10. The created work lists are stored in the storing unit 13 of the engineering server 10.

Next, a process of issuing the created work lists is performed at the work list issuing unit 14a of the engineering server 10 (Step S12: first step). Thereby, the work lists created at the engineering server 10 are transmitted from the engineering server 10 to the engineering client 20. Transmission of the work lists from the engineering server 10 to the engineering clients 20b, 20c is performed through the control network N, for example, and transmission of the work lists from the engineering server 10 to the engineering client 20a is performed when the engineering client 20a is connected directly to the engineering server 10, for example.

Next, a process of receiving the work lists issued at the engineering server 10 is performed at the engineering client 20 (Step S21). Specifically, a process of receiving the work lists issued at the engineering server 10 is performed at the list receiving unit 24a provided to the control processing unit 24 of the engineering client 20. The receive work lists are stored in the storing unit 23 provided to the engineering client 20.

Following this, a process of performing authentication of a worker (user) and granting work authority to an authenticated worker is performed at the engineering client 20 (Step S22: second step). Specifically, authentication of a worker is performed for example by collating, at the user authenticating unit 24b, a user ID and a password for authentication input through operation of the operating unit 21 by a worker who operates the engineering client 20 with a user ID and a password for authentication retained in advance. Authentication of a worker may be performed at the time of log-in of a worker to the engineering client 20 or may be performed at the time when work using the work instruction list L1 is started.

Also, work authority is granted to an authenticated worker by the user authority granting unit 24c based on the work authority list L2 and user authority list L3 received at the list receiving unit 24a. For example, if an authenticated worker is "AAA", it can be known from the user authority list L3 shown in FIG. 6 that the worker "AAA" is allocated with a role of "Field Engineer". Thereby, based on the work authority list L2 shown in FIG. 5, a process of granting, to the worker "AAA", work authority about items the work administration of which is "Field" in the row the role Q1 of which is "Field Engineer" is performed by the user authority granting unit 24c.

As mentioned above, the work authority list L2 is a list in which possibility information ED defining whether or not to allow modification of each item in the work instruction list L1 is associated with a role of worker Q1. Because of this, by the above-mentioned process being performed by the user authority granting unit 24c, work authority is granted about work that an authenticated worker is allowed to perform among work (items) defined in the work instruction list L1. For example, among the items in the input/output information J1 of the work instruction list L1 shown in (a) in FIG. 4, work authority about work such as "Communication Method", "Device Address", "Device Model Name", "Channel Information", "I/O Channel Test Result" or "Field Instrument Test Result" are granted to the above-mentioned worker "AAA".

Upon completion of granting of work authority to a worker, work using the engineering client 20 is performed based on an instruction from the worker (Step S23). For example, based on an instruction from the worker "AAA", the above-mentioned work, work authority of which is granted to the worker "AAA" ("Communication Method", "Device Address", "Device Model Name", "Channel Information", "I/O Channel Test Result", "Field Instrument Test Result" and the like) is performed by the work performing unit 24d.

If the above-mentioned work has been performed, a process of creating the work progress list L4 based on a work result is performed at the work progress list generating unit 24e (Step S24). For example, if work of the above-mentioned item "Communication Method" has ended, the work progress list L4 including information indicating that the work of the item (Communication Method) has ended and information indicating a work result thereof is created. The above-mentioned information indicating a work result includes information indicating completion (which means that the work has ended without abnormality) or information indicating failure (which means that the work has ended due to abnormality). The work progress list L4 may be generated as the work instruction list L1 to which information about work performed at the work performing unit 24d is added.

Following this, a process of issuing the created work progress list L4 is performed at the work progress list generating unit 24e of the engineering client 20 (Step S25). Thereby, the work progress list L4 generated at the engineering client 20 is transmitted from the engineering client 20 to the engineering server 10. Transmission of the work progress list L4 from the engineering clients 20b, 20c to the engineering server 10 is performed through the control network N, for example, and transmission of the work progress list L4 from the engineering client 20a to the engineering server 10 is performed when the engineering client 20a is connected directly to the engineering server 10, for example.

Next, a process of receiving the work progress list L4 issued at the engineering client 20 is performed at the engineering server 10 (Step S13). Specifically, a process of receiving the work progress list L4 issued at the engineering client 20 is performed at the work progress confirming unit 14b provided to the processing unit 14 of the engineering server 10. If the work progress lists L4 are issued at a plurality of the engineering clients 20, a process of separately receiving each work progress list L4 is performed.

Upon reception of the work progress list L4, a process of confirming whether or not all the work has been completed is performed at the work progress confirming unit 12b of the engineering server 10 (Step S14). If it is determined that all the work has not been completed (if the determination result at Step S14 is "NO"), a process of setting protection flags only for a portion on which work has been completed is performed at the protection setting unit 14c (Step S15). For example, if work on an I/O channel for which an I/O tag T1 which is "I/O-1" is set in the work instruction list L1 shown in (a) in FIG. 4 has ended, an I/O protection flag is set as I/O protection information PR in the row of the I/O tag T1 which is the "I/O-1". Such setting is performed for prevention of erroneous editing thereafter.

If the above-mentioned process has ended, a process of modifying work authority is performed at the work authority modifying unit 14d of the engineering server 10 as necessary (Step S16). For example, such modification of work authority is performed for example in a situation where setting of an I/O module 120 has been completed in the case that after setting of the I/O module 120 has been completed, respective setting of the sensor instrument 111 connected to the I/O module 120 and of the valve instrument 112 to act based on a result of measurement by this sensor instrument 111 becomes possible. If work authority needs not be modified, the process of Step S16 is omitted. Then, if the process of Step S16 has ended, a process of issuing a work list is performed again (Step S12).

In contrast to this, if it is determined that all the work has been completed (if the determination result at Step S14 is "YES"), a process of setting protection flags for all the work is performed at the protection setting unit 14c (Step S17). That is, protection flags are set also for a portion on which work is determined as not having been completed last time, and this results in protection flags being set for all the work. With the above-mentioned processes, a series of processes shown in FIG. 7 ends.

The series of processes shown in FIG. 7 preferably ends after protection flags are set for all the work. However, if the cause is apparent, the series of processes shown in FIG. 7 may be able to end even if protection flags are not set for all the work. Examples of such situations may include a situation where work cannot be completed for example because supply of parts that are necessary for replacement is not ready.

As mentioned above, in the present embodiment, the work lists (the work instruction list L1, the work authority list L2 and the user authority list L3) including information related to work necessary for performing engineering of the process control system 100 are issued from the engineering server 10 to each of the engineering clients 20. Then, at the engineering client 20, work authority is granted to each worker based on the work lists issued at the engineering server 10, and work on constituent apparatuses constituting the process control system 100 can be performed in the range of granted work authority.

Because in this manner, in the present embodiment, work authority corresponding to roles and skills is granted to workers, the possibility of occurrence of erroneous setting lowers. Also, even if work is performed in parallel, it is possible to prevent setting work from being performed again by a worker about an item which has already been set by setting work of another worker. In this manner, in the present embodiment, work mistakes can be reduced while ensuring engineering quality.

In the explanation shown above, the engineering assistant system, engineering assistant method, server apparatus, storage medium, client apparatus and client program according to one embodiment of the present invention are explained, but the present invention is not limited to the above-mentioned embodiments, but can be modified freely within the scope of the present invention. For example, in addition to the work instruction list L1, work authority list L2 and user authority list L3 explained in the above-mentioned embodiments, a work order list may be used.

The above-mentioned work order list is a list in which the order of work is defined. For example, it is a list including information indicating for example that after installation of the I/O module 120 is completed, setting of the field instrument 110 becomes possible. By the engineering client 20 referring to contents of such a work order list, it becomes possible to limit work authority more strictly and precisely.

Also, although in the above-mentioned embodiment explained, the I/O protection information PR is included in the work instruction list L11, the I/O protection information PR needs not be included in the work instruction list L11 necessarily. For example, it may be prepared as a list different from the work instruction list L11 while it is associated with I/O tags T1 of the work instruction list L11. Also, although in the above-mentioned embodiment explained, work administration is included in the work authority list L2, work administration may be prepared as a list different from the work authority list L2. Also, the work lists (the work instruction list L1, the work authority list L2 and the user authority list L3) may be organized into a single list or may be distributed as a compressed file.

Also, the engineering server 10 and the instrumentation database 30 may be ones realized by cloud computing, for example. Here, cloud computing may be for example one that meets the definition described in a document specified by the following URLs (Uniform Resource Locators) (the definition recommended by National Institute of Standards and Technology).

http://nvlpubs.nist.govinistpubs/Legacy/SP/nistspecial-
     publication800-145.pdf   https://www.ipa.go.jp/files/
     000025366.pdf Also, in the above-mentioned embodiment explained, the engineering server 10 to issue the work lists (the work instruction list L1, the work authority list L2 and the user authority list L3) and the instrumentation database 30 to store design information are implemented as separate apparatuses. However, these engineering server 10 and instrumentation database 30 may be implemented as an integrated apparatus. If the engineering server 10 and the instrumentation database 30 are implemented as an integrated apparatus, design information of the instrumentation database 30 is stored in the storing unit 13 shown in FIG. 2.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST

1: engineering assistant system; 10: engineering server; 13: storing unit; 14a: work list issuing unit; 14c: protection setting unit; 20: engineering client; 24b: user authenticating unit; 24c: user authority granting unit; 24e: work progress list generating unit; 100: process control system; L1: work instruction list; L2: work authority list; L3: user authority list

What is claimed is:

1. An engineering assistant system that assists engineering of a process control system, including workers and a field instrument, for control of an industrial process, the process control system comprising a constituent apparatus, the engineering assistant system comprising:

a server apparatus that issues a work list including a first list defining work necessary for performing the engineering of the process control system with the field instrument; and at least one client apparatus that grants work authority for each worker based on the work list issued by the server apparatus and is connected to the constituent apparatus using at least one of a network and a cable, to perform work on the constituent apparatus within a range of granted work authority, wherein at least two workers perform work in parallel, the client apparatus has a work progress list generating unit that generates a work progress list based on work performed, and the server apparatus has a protection setting unit that sets, based on the generated work progress list, protection information in the work list issued to the client apparatus for preventing redundant performance of work defined in the first list, wherein the work list further includes:
a second list including information indicating authority according to a role of a worker; and
a third list defining information indicating a role of each worker, wherein the role of each worker defined in the third list is not redundant;

the client apparatus has an authenticating unit that performs authentication of a worker to use the client apparatus; and the client apparatus has an authority granting unit that, based on the second list and the third list, grants work authority about work that a worker authenticated by the authenticating unit is allowed to perform among work defined in the first list.

2. The engineering assistant system according to claim 1, wherein the second list includes information indicating work administration defining which among roles of workers is in charge of work defined in the first list, and the authority granting unit grants work authority to a worker based at least in part on the work administration.

3. The engineering assistant system according to claim 1, wherein the server apparatus further has:

a work progress confirming unit that receives the work progress list and confirms whether or not all the work has been completed; and a work authority modifying unit that modifies the work authority as necessary according to a progress of the work, wherein upon determination by the work progress confirming unit that all the work has not been completed, protection setting unit sets protection flags only for a portion on which work has been completed, and upon determination by the work progress confirming unit that all the work has been completed, the protection setting unit sets protection flags for all the work.

4. An engineering assistant method of assisting engineering of a process control system, including workers and a field instrument, for control of an industrial process, the process control system including a constituent apparatus, the engineering assistant method comprising:

providing a server apparatus programmed to:
issue a work list including a first list defining work necessary for performing the engineering of the process control system using the server apparatus;
grant work authority for each worker, with a client apparatus, based on the work list issued in the issuing;
perform work on the constituent apparatus within a range of granted work authority using the client apparatus, wherein at least two workers perform work in parallel;
generate, by the client apparatus, a work progress list indicating work having been performed; and
set, by the server apparatus and based on the work progress list having been generated, protection information in the work list issued by the server apparatus to the client apparatus for preventing redundant performance of work having been performed among work defined in the first list, wherein the work list further includes:
a second list including information indicating authority according to a role of a worker; and
a third list defining information indicating a role of each worker, wherein the role of each worker defined in the third list is not redundant;

the client apparatus has an authenticating unit that performs authentication of a worker to use the client apparatus; and the client apparatus has an authority granting unit that, based on the second list and the third list, grants work authority about work that a worker authenticated by the authenticating unit is allowed to perform among work defined in the first list.

5. A non-transitory computer-readable medium storing thereon a program that, when executed by a computer, causes the computer to perform operations that assists engineering of a process control system, including workers and a field instrument, for control of an industrial process, the process control system comprising a constituent apparatus, the operations comprising:

issue a work list including a first list defining work necessary for performing an engineering of the process control system using a server apparatus;
grant work authority for each of at least two workers based on the work list issued in the issuing of a work list;
perform work on a constituent apparatus within a range of granted work authority using a client apparatus, wherein the at least two workers perform work in parallel;
generate, by the client apparatus, a work progress list indicating work having been performed; and
set, by the server apparatus and based on the work progress list having been generated, protection information in the work list issued by the server apparatus to the client apparatus for preventing redundant performance of work having been performed among work defined in the first list, wherein
the work list further includes:
a second list including information indicating authority according to a role of a worker; and
a third list defining information indicating a role of each worker, wherein the role of each worker defined in the third list is not redundant;

the client apparatus has an authenticating unit that performs authentication of a worker to use the client apparatus; and the client apparatus has an authority granting unit that, based on the second list and the third list, grants work authority about work that a worker authenticated by the authenticating unit is allowed to perform among work defined in the first list.

6. A server apparatus that provides information to assist engineering of a process control system, including workers and a field instrument, for control of an industrial process, the process control system comprising a constituent apparatus, the server apparatus comprising:
  a storing unit that stores design information of a constituent apparatus of the process control system
  an issuing unit that uses the design information stored in the storing unit to issue a work list including a first list defining work necessary for performing the engineering of the process control system, wherein at least two workers perform work in parallel; and
  a protection setting unit that sets, based on a work progress list that has been generated by a client apparatus and indicates work having been performed, protection information in the work list for preventing redundant performance of work having been performed among work defined in the first list, wherein
  the work list further includes:
    a second list including information indicating authority according to a role of a worker; and
    a third list defining information indicating a role of each worker, wherein the role of each worker defined in the third list is not redundant;
  an authenticating unit that performs authentication of a worker to use the client apparatus; and
  an authority granting unit that, based on the second list and the third list, grants work authority about work that a worker authenticated by the authenticating unit is allowed to perform among work defined in the first list.

7. A method for providing information by a server apparatus to assist engineering of a process control system, including workers and a field instrument, for control of an industrial process, the process control system comprising a constituent apparatus, the method comprising:
  issuing a work list including a first list defining work necessary for performing the engineering of the process control system using the server apparatus;
  granting work authority for each worker, with a client apparatus, based on the work list issued in the issuing;
  performing work on the constituent apparatus within a range of granted work authority using the client apparatus, wherein at least two workers perform work in parallel;
  generating, by the client apparatus, a work progress list indicating work having been performed; and
  setting, by the server apparatus and based on the work progress list having been generated, protection information in the work list issued by the server apparatus to the client apparatus for preventing redundant performance of work having been performed among work defined in the first list, wherein
  the work list further includes:
    a second list including information indicating authority according to a role of a worker; and
    a third list defining information indicating a role of each worker, wherein the role of each worker defined in the third list is not redundant;
  the client apparatus has an authenticating unit that performs authentication of a worker to use the client apparatus; and
  the client apparatus has an authority granting unit that, based on the second list and the third list, grants work authority about work that a worker authenticated by the authenticating unit is allowed to perform among work defined in the first list. apparatus as defined in the first list.

8. A non-transitory, computer-readable medium storing thereon a program that, when executed by a computer, causes the computer to perform operations that assists engineering of a process control system, including workers and a field instrument, for control of an industrial process, the process control system comprising a constituent apparatus, the operations comprising:
  storing design information of a constituent apparatus, wherein a process control system for control of an industrial process comprises the constituent apparatus;
  using the stored design information to issue a work list for at least two workers including:
  (i) a first list defining work instructions that are necessary for performing engineering of the process control system, and
  (ii) protection information configured to prevent redundant performance of work by the at least two workers performing work on the constituent apparatus as defined in the first list;
  granting work authority for each worker based on the work list issued in the issuing;
  performing work on the constituent apparatus within a range of granted work authority using a client apparatus, wherein at least two workers perform work in parallel;
  generating, by the client apparatus, a work progress list indicating work having been performed; and
  setting, by the server apparatus and based on the work progress list having been generated, protection information in the work list issued by the server apparatus to the client apparatus for preventing redundant performance of work having been performed among work defined in the first list, wherein
  the work list further includes:
    a second list including information indicating authority according to a role of a worker; and
    a third list defining information indicating a role of each worker, wherein the role of each worker defined in the third list is not redundant;
  the client apparatus has an authenticating unit that performs authentication of a worker to use the client apparatus; and
  the client apparatus has an authority granting unit that, based on the second list and the third list, grants work authority about work that a worker authenticated by the authenticating unit is allowed to perform among work defined in the first list.

9. The engineering assistant system according to claim 1, further comprising:
  a work authority modifying unit that modifies the work authority for each worker according to work progress.

10. The engineering assistant system according to claim 1, wherein the server apparatus is further programmed to transmit the updated work list to client apparatus for at least two workers that are currently working together on the constituent apparatus.

11. The engineering assistant system according to claim 1, wherein protection information includes a plurality of protection flags that each correspond to a different portion of work that is performed on the constituent apparatus.

* * * * *